United States Patent
Rob et al.

(10) Patent No.: US 11,645,391 B2
(45) Date of Patent: May 9, 2023

(54) PROTECTING COMPUTER SYSTEMS AGAINST MALICIOUS SOFTWARE STORED ON REMOVEABLE DATA STORAGE DEVICES

(71) Applicant: Saudi Arabian Oil Company, Dhahran (SA)

(72) Inventors: Rafat Rob, Dhahran (SA); Khaled F. Alotaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 277 days.

(21) Appl. No.: 17/067,185

(22) Filed: Oct. 9, 2020

(65) Prior Publication Data
US 2022/0114258 A1    Apr. 14, 2022

(51) Int. Cl.
*G06F 21/56* (2013.01)
*G06F 13/16* (2006.01)
*G06F 13/42* (2006.01)
*G06F 21/55* (2013.01)

(52) U.S. Cl.
CPC ........ *G06F 21/566* (2013.01); *G06F 13/1668* (2013.01); *G06F 13/4282* (2013.01); *G06F 21/556* (2013.01); *G06F 2213/0042* (2013.01); *G06F 2221/032* (2013.01)

(58) Field of Classification Search
CPC ....................................................... G11C 8/16
See application file for complete search history.

(56) References Cited

U.S. PATENT DOCUMENTS

| 6,308,273 | B1* | 10/2001 | Goertzel | .................. | H04L 9/40 726/2 |
| 7,739,732 | B2* | 6/2010 | Camilli | .................. | G06F 21/79 726/16 |
| 9,088,601 | B2 | 7/2015 | Friedrichs et al. | | |
| 2015/0339497 | A1 | 11/2015 | Kurian | | |
| 2018/0375886 | A1 | 12/2018 | Kirti et al. | | |

FOREIGN PATENT DOCUMENTS

WO    WO 2019032275    2/2019

OTHER PUBLICATIONS

PCT International Search Report and Written Opinion in International Appln. No. PCT/US2021/054159, dated Jan. 4, 2022, 14 pages.

(Continued)

*Primary Examiner* — Henry Tsai
*Assistant Examiner* — Juanito C Borromeo
(74) *Attorney, Agent, or Firm* — Fish & Richardson P.C.

(57) ABSTRACT

In an example method, one or more processors determine that a first data storage device has been communicatively coupled to a first computer system, determine that the first computer system is associated with a first geographical location, determine that the first data storage device is associated with a first user, determine that the first user is associated with one or more additional data storage devices, and determine usage data regarding the one or more additional data storage devices. Further, the one or more processors control a transmission of data between the first data storage device and first computer system based on the first geographical location and the usage data.

28 Claims, 9 Drawing Sheets

(56) References Cited

OTHER PUBLICATIONS

Chen et al., "Lessons from Stuxnet," Computer, Apr. 2011, 44:91-93.
Device Lock, Inc., "DeviceLock DLP—Comprehensive Features List," 1997-2020, 7 pages.
Ivanti.com [online], "Ivanti Device Control," 2017, retrieved Jan. 11, 2021, retrieved from URL <https://advensis.com.tr/wp-content/uploads/2020/09/ivi-1941-ivanti-device-control.pdf>, 2 pages.
Kharraz et al., "USBESAFE: An End-Point Solution to Protect Against USB-Based Attacks," UNISEN1X Association, 22nd International Symposium on Research in Attacks, Intrusions, and Defenses, 2019, 15 pages.
Kolter et al., "Learning to detect malicious executables in the wild," KDD, Seattle, Washington, Aug. 2004, 9 pages.
Suzaki et al. "DeviceVeil: Robust Authentication for Individual USB Devices Using Physical Unclonable Functions," 49th Annual IEEE/IFIP International Conference on Dependable Systems and Networks (DSN), Portland, OR, USA, 2019, 13 pages.
usb-lock-rp.com [online], "USB Device Control & USB Lockdown," 2004-2020, retrieved Aug. 14, 2020, retrieved from URL <https://www.usb-lock-rp.com/>, 15 pages.

\* cited by examiner

PROTECTING COMPUTER SYSTEMS AGAINST MALICIOUS SOFTWARE STORED ON REMOVEABLE DATA STORAGE DEVICES

TECHNICAL FIELD

The disclosure relates to systems and techniques for protecting computer systems against malicious software stored on removable data storage devices.

BACKGROUND

Malicious software (often called "malware") is software that is intentionally designed to cause damage to a computer system or a computer network. As an example, malicious software can exploit vulnerabilities in a computer system or computer network to destroy data, prevent data from being retrieved data by user, expose sensitive data to third-parties, or disrupt software or hardware operations.

In some implementations, malicious software can be introduced to a computer system or computer network via a removable data storage device, such as a universal serial bus (USB)-based storage device (for example, a "flash drive" that includes flash memory with a USB connection interference for exchanging data with a computer system).

In some implementations, malicious software can be introduced to a computer system or a computer network by a user unintentionally. For example, a user might be unaware that a data storage device is storing malicious software when inserting the data storage device into his computer system. Upon execution, the malicious software can perform one or more operations that cause damage to the computer system without the user's permission.

SUMMARY

This disclosure describes systems and techniques for protecting computer systems against malicious software stored on removable data storage devices. In an example implementation, a security system can monitor the operation of one or more computer systems. Upon detecting that a removable storage device has been connected to a particular computer system, the security system can determine a security risk associated with the removable storage device, and selectively authorize the computer system to retrieve data from the removable storage device or prevent the computer system from doing so. For example, if the security system determines that the security risk associated with the removable storage device is sufficiently high, the security system can prevent the computer system from retrieving data from the removable storage device. As another example, if the security system determines that the security risk associated with the removable storage device is sufficiently low, the security system can enable the computer system to retrieve data from the removable storage device.

The implementations described in this disclosure can provide various technical benefits. For instance, a security system can enable computer systems or computer networks to operable more safely and securely. As an example, the security system can assess the security risk associated with removable storage devices, such as a risk that a particular removable storage device is storing malicious software, and proactively prevent computer systems from retrieving data stored on the storage devices. Accordingly, the operations of the computer systems are less likely to be disrupted by malicious software. Further, the security system can enable one or more computer systems or computer networks to function more efficiently or effectively. For instance, by preventing or otherwise reducing a likelihood of an execution of malicious software, the security system enables computer systems or computer networks to devote a greater amount of computational or network resources to performing their assigned tasks (for example, by eliminating or otherwise reducing the amount of computational or network resources that are expended to perform malicious or otherwise unintended tasks).

In an aspect, a method includes determining, using one or more processors, that a first data storage device has been communicatively coupled to a first computer system; determining, using the one or more processors, that the first computer system is associated with a first geographical location; determining, using the one or more processors, that the first data storage device is associated with a first user; determining, using the one or more processors, that the first user is associated with one or more additional data storage devices; determining, using the one or more processors, usage data regarding the one or more additional data storage devices; and controlling, by the one or more processors, a transmission of data between the first data storage device and first computer system based on the first geographical location and the usage data.

Implementations of this aspect can include one or more of the following features.

In some implementations, the one or more additional data storage devices can include a second data storage device. The usage data can include an indication that the second data storage device is communicatively coupled to a second computer system, and an indication of a second geographical location associated with the second computer system.

In some implementations, controlling the transmission of data between the first data storage device and first computer system can include determining that the second data storage device is communicatively coupled to the second computer system concurrently with the first data storage device being communicatively coupled to the first computer system; determining that the first geographical location is within a threshold distance from the second geographical location; and responsive to (i) determining that the second data storage device is communicatively coupled to the second computer system concurrently with the first data storage device being communicatively coupled to the first computer system and (ii) determining that the first geographical location is within the threshold distance from the second geographical location, enabling the first computer system to receive data from the first data storage device.

In some implementations, controlling the transmission of data between the first data storage device and first computer system can include determining that the second data storage device is not communicatively coupled to the second computer system concurrently with the first data storage device being communicatively coupled to the first computer system; and responsive to determining that the second data storage device is not communicatively coupled to the second computer system concurrently with the first data storage device being communicatively coupled to the first computer system, enabling the first computer system to receive data from the first data storage device.

In some implementations, controlling the transmission of data between the first data storage device and first computer system can include determining that the second data storage device is communicatively coupled to the second computer system concurrently with the first data storage device being communicatively coupled to the first computer system;

determining that the first geographical location is greater than a threshold distance from the second geographical location; and responsive to (i) determining that the second data storage device is communicatively coupled to the second computer system concurrently with the first data storage device being communicatively coupled to the first computer system and (ii) determining that the first geographical location is greater than the threshold distance from the second geographical location, limiting a retrieval of data from the first data storage device by the first computer system.

In some implementations, limiting the retrieval of data from the first data storage device by the first computer system can include preventing the first computer system from retrieving data from the first data storage device.

In some implementations, the first data storage device can be a first universal serial bus (USB) data storage device.

In some implementations, the one or more additional data storage devices can be one or more second USB data storage devices.

In some implementations, determining that the first data storage device has been communicatively coupled to the first computer system can include determining that the first data storage data has been inserted into a physical data port of the first computer system.

In some implementations, the one or more processors can be remote from the first computer system.

In some implementations, the first computer system can include the one or more processors.

In another aspect, a method includes determining, using one or more processors, that a first data storage device has been communicatively coupled to a first computer system located at a first facility; determining, using the one or more processors, a plurality of characteristics of the first data storage device, where the characteristics of the first data storage device include (i) an indication of whether the first data storage device is approved for use with the first computer system, and (ii) an indication that data stored on the first data storage device is associated with a particular facility; calculating, using the one or more processors, a security metric for the first data storage device based on the characteristics of the first data storage device; and controlling, by the one or more processors, a transmission of data between the first data storage device and the first computer system based on the security metric.

Implementations of this aspect can include one or more of the following features.

In some implementations, calculating the security metric for the first data storage device can include determining a weighted sum of a plurality of scores, where each of the scores is associated with a different one of the characteristics of the first data storage device.

In some implementations, a weight associated with one of the characteristics of the first data storage device can be different from a weight associated with another one of the characteristics of the first data storage device.

In some implementations, calculating the security metric for the first data storage device can include determining that the particular facility associated with the data stored on the first data storage device is the same as the first facility; and responsive to determining that the particular facility associated with the data stored on the first data storage device is the same as the first facility, increasing a value of a first score of the plurality of scores.

In some implementations, calculating the security metric for the first data storage device can include determining that the particular facility associated with the data stored on the first data storage device is different from the first facility; and responsive to determining that the particular facility associated with the data stored on the first data storage device is different from the first facility, decreasing a value of a first score of the plurality of scores.

In some implementations, calculating the security metric for the first data storage device can include determining that the particular facility associated with the data stored on the first data storage device is the same as the first facility; and responsive to determining that the particular facility associated with the data stored on the first data storage device is the same as the first facility, increasing a value of a first score of the plurality of scores.

In some implementations, calculating the security metric for the first data storage device can include determining that the particular facility associated with the data stored on the first data storage device is different from the first facility; and responsive to determining that the particular facility associated with the data stored on the first data storage device is different from the first facility, decreasing a value of a first score of the plurality of scores.

In some implementations, the method can further include determining, using the one or more processors, security data regarding one or more security events with respect to at least one of the first computer system or one or more additional computer systems; and modifying at least one of the weights based on the security data.

In some implementations, the security data can include an indication that a first security event is associated with a second data storage device, and an indication of one or more characteristics of the second data storage device.

In some implementations, the first security event can be a detection of malware on the second data storage device.

In some implementations, controlling the transmission of data between the first data storage device and the first computer system can include determining that a value of the security metric is greater than a threshold value, and responsive to determining that the value of the security metric is greater than the threshold value, enabling the first computer system to receive data from the first data storage device.

In some implementations, controlling the transmission of data between the first data storage device and the first computer system can include determining that a value of the security metric is less than or equal to a threshold value, and responsive to determining that the value of the security metric is less than or equal to the threshold value, limiting a retrieval of data from the first data storage device by the first computer system.

In some implementations, limiting the retrieval of data from the first data storage device by the first computer system can include preventing the first computer system from retrieving data from the first data storage device.

In some implementations, the first data storage device can be a first universal serial bus (USB) data storage device.

In some implementations, determining that the first data storage device has been communicatively coupled to the first computer system can include determining that the first data storage data has been inserted into a physical data port of the first computer system.

In some implementations, the one or more processors can be remote from the first computer system.

In some implementations, the first computer system can include the one or more processors.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
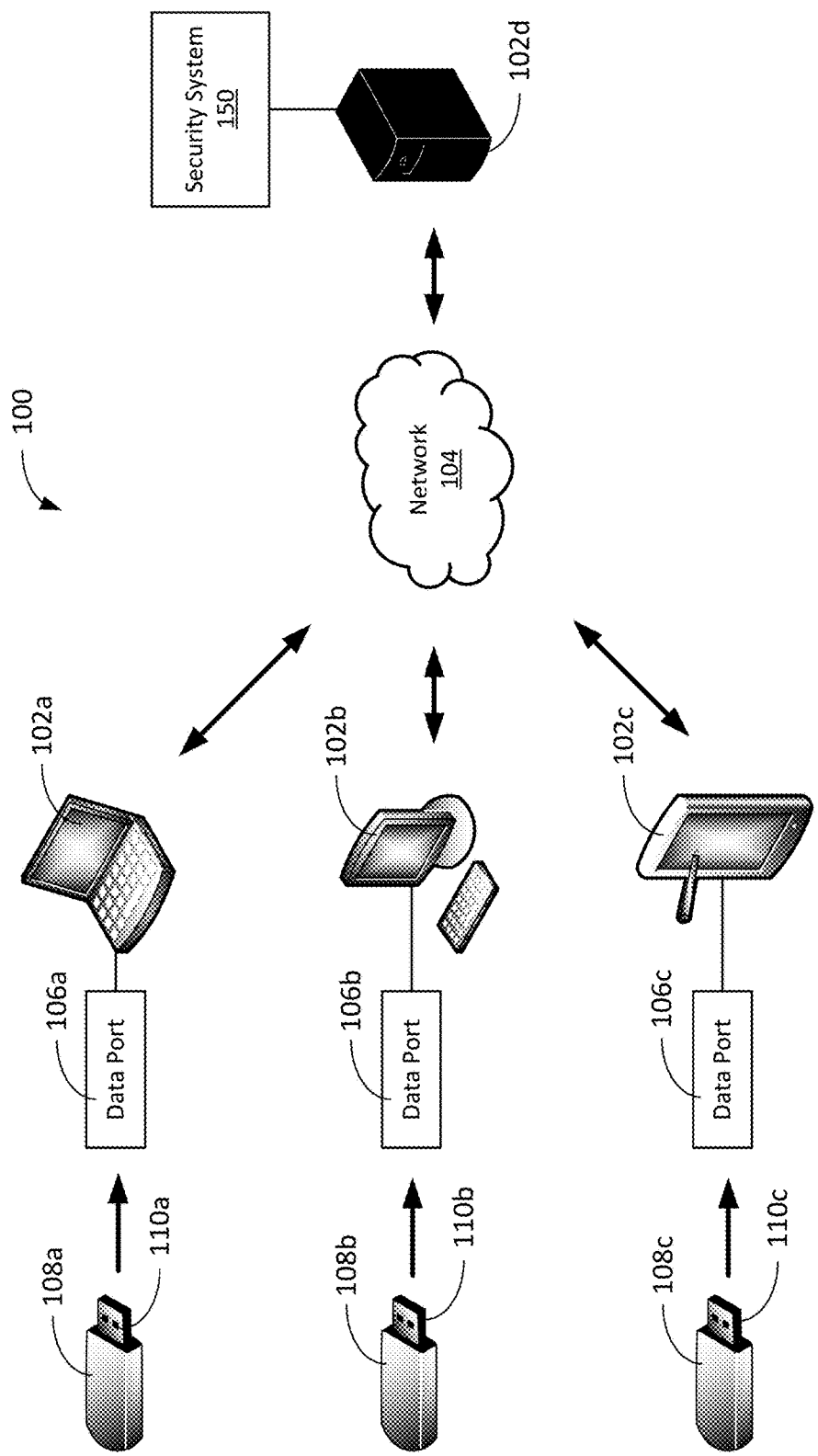
FIG. 1 is a diagram of an example network-enabled system.

An example network-enabled system 100 is shown in FIG. 1. The system 100 includes several computer systems 102a-102d communicatively coupled to one another through a network 104. Further, a security system 150 is maintained on at least one of the computer systems (for example, the computer system 102d). During an operation of the system 100, the security system 150 can control the transmission of data between one or more data storage devices 108a-108c and the computer systems 102a-102c, for example, to prevent the transmission of malicious software to the system 100.

Each of the computer systems 102a-102d can include any number of electronic device that are configured to receive, process, and transmit data. Examples of the computer systems 102a-102d include client computing devices (such as desktop computers or notebook computers), server computing devices (such as server computers or cloud computing systems), mobile computing devices (such as cellular phones, smartphones, tablets, personal data assistants, notebook computers with networking capability), wearable computing devices (such as a smart phone or a headset), and other computing devices capable of receiving, processing, and transmitting data. In some implementations, the computer systems 102a-102d can include computing devices that operate using one or more operating systems (as examples, Microsoft Windows, Apple macOS, Linux, Unix, Google Android, and Apple iOS, among others) and one or more architectures (as examples, x86, PowerPC, and ARM, among others). In some implementations, one or more of the computer system 102a-102d need not be located locally with respect to the rest of the system 100, and one or more of the computer systems 102a-102d can be located in one or more remote physical locations.

Each the computer systems 102a-102d can include a respective user interface that enables users interact with the computer system 102a-102d and the security system 150, such as to view data from one or more of the computer systems 102a-102d or the security system 150, transmit data from one computer system to another, or to issue commands to one or more of the computer systems 102a-102d or the security system 150. Commands can include, for example, any user instruction to one or more of the computer system 102a-102d or the security system 150 to perform particular operations or tasks. In some implementations, a user can install a software application onto one or more of the computer systems 102a-102d to facilitate performance of these tasks.

In FIG. 1, the computer systems 102a-102d are illustrated as respective single components. However, in practice, the computer systems 102a-102d can be implemented on one or more computing devices (for example, each computing device including at least one processor such as a microprocessor or microcontroller). As an example, the computer system 102d can be a single computing device that is connected to the network 104, and the security system 150 can be maintained and operated on the single computing device. As another example, the computer system 102d can include multiple computing devices that are connected to the network 104, and the security system 150 can be maintained and operated on some or all of the computing devices. For instance, the computer system 102d can include several computing devices, and the security system 150 can be distributive on one or more of these computing devices.

The network 104 can be any communications network through which data can be transferred and shared. For example, the network 104 can be a local area network (LAN) or a wide-area network (WAN), such as the Internet. The network 104 can be implemented using various networking interfaces, for instance wireless networking interfaces (such as Wi-Fi, Bluetooth, or infrared) or wired networking interfaces (such as Ethernet or serial connection). The network 104 also can include combinations of more than one network, and can be implemented using one or more networking interfaces.

During an example operation of the system 100, users can interact with one or more of the computer systems 102a-102d (for example, using a respective graphical user interface) to instruct the computer systems to receive data, present the data, process the data, and transmit data to other computer systems. Further, in some implementations, a user can communicatively couple a data storage data to facilitate the transfer of data from one computer system to another.

As an example, as shown in FIG. 1, each of the computer system 102a-102c can include a respective data port 106a-106c for transmitting and receiving data. Each data ports 106a-106c can include a physical connection interface (for example, a receptacle or socket) configured to interconnect with another corresponding physical connection interface (for example, a plug). The physical connection interfaces can include respective electrical conductors (for example, wires or traces) that are arranged such that they mate with one another when the physical connection interfaces are interconnected, such that one or more electrical signals can be transmitted between them. This mating enables electrical signals to be transmitted between two devices via the physical connection interfaces. For example, a first device can include a receptacle, and a second device can include a corresponding plug. When the plug is inserted into the receptacle, the first device and second device can transmit electrical signals to one another (for example, electrical signals representing data) via their respective electrical conductors and interconnection between the receptacle and the plug.

For instance, as shown in FIG. 1, a number of data storage devices 108a-108c can be used to store data. Examples of the data storage devices 108a-108c include semiconductor memory devices (for example, "flash drives" having electronic solid-state non-volatile computer memory storage media for storing data), magnetic disk drives, magneto-optical disk drive, and optical disk drive. Further, each of the data storage devices 108a-108c can include a respective physical connection interface 110a-110c (for example, a plug) that is configured to communicatively couple to one or more of the physical connection interfaces of the data ports 106a-106c (for example, one or more corresponding receptacles). Further, in some implementations, the physical connection interfaces 110a-110c can be configured such that they can be reversibly removed or detached from the data ports 106a-106c after use. This enables as user to reversibly decouple the data storage devices 108a-108c from the computer systems 102a-102c after use, such that the data storage devices can be transported elsewhere or connected to another computer system.

In some implementations, the data ports 106a-106c and the physical connection interfaces 110a-110c can be implemented according to a particular industry standard or technical standard. For example, the data ports 106a-106c and the physical connection interfaces 110a-110c can be implemented in accordance with a Universal Serial Bus (USB) standard (for example, as defined by the USB Implementers Forum, USB-IF), such as USB 1.0, USB 1.1, USB 2.0, USB 3.0, USB 3.1, USB 3.2, USB 4, or some other standard. As further examples, the data ports 106a-106c and the physical connection interfaces 110a-110c can be implemented in accordance with an external Serial AT Attachment (eSATA) standard (for example, as defined by the Serial ATA International Organization, SATA-IO, or International Committee for Information Technology Standards, INCITS), an ExpressCard standard (for example, as defined by the ITU Telecommunication Standardization Sector, ITU-T or USB-IF), a FireWire standard (for example, as defined by the Institute of Electrical and Electronics Engineers, IEEE), or a Thunderbolt standard (for example, as defined by Intel Corporation, Santa Clara, Calif.). Although example connection interfaces and standards are described above, there are merely illustrative examples. In practice, other connection interfaces and standards also can be used, either instead of or in addition to those described above.

Figure 2:
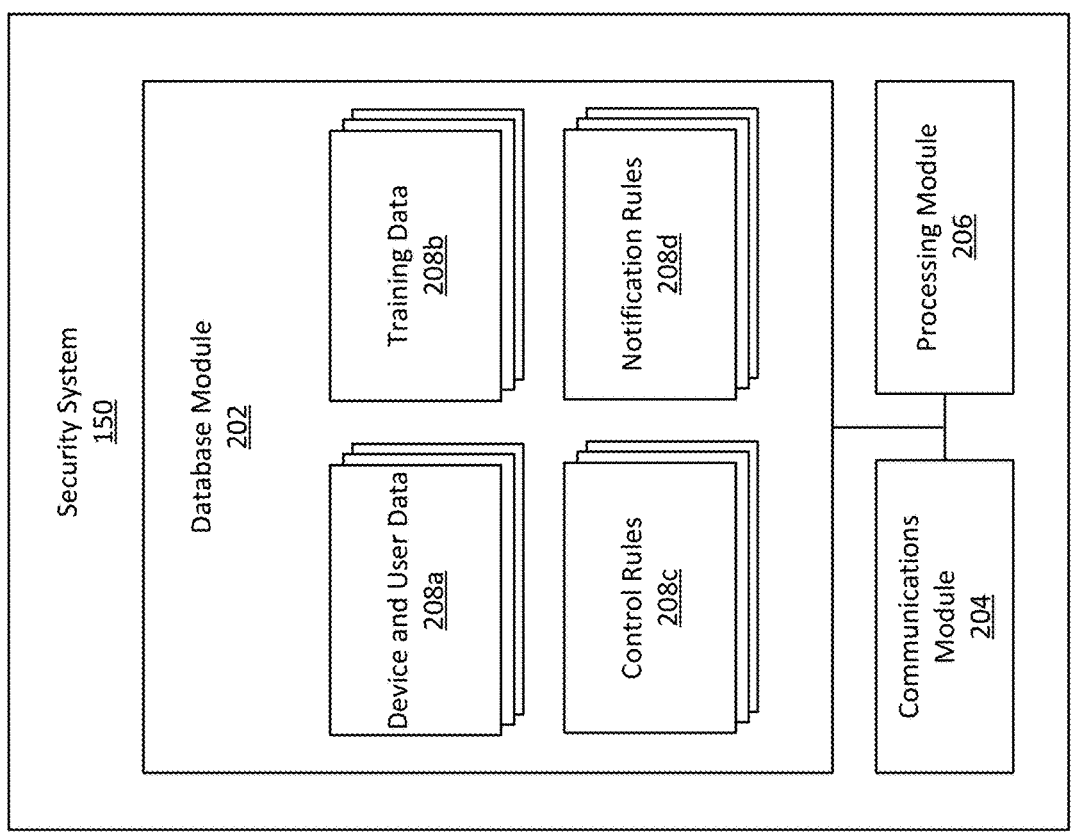
FIG. 2 is a diagram of an example power management system.

FIG. 2 shows various aspects of the security system 150. The security system 150 includes several modules that perform particular functions related to the operation of the system 100. For example, the security system 150 can include a database module 202, a communications module 204, and a processing module 206.

The database module 202 maintains information related to monitoring and controlling the operation of the computer systems 102a-102c.

The database module 202 can store device and user data 208a regarding one or more of the computer systems 102a-102c, one or more of the data storage devices 108a-108c, and one or more respective users of those systems and devices.

For example, the data 208a can include information regarding each of the computer systems 102a-102c. For instance, the data 208a can include a record of one or more users that are associated with each of the computer systems 102a-102c, a record of a geographical location of each of the computer systems 102a-102c, and record of a facility that is associated with each of the computer systems 102a-102c (for example, a particular building, plant, complex, or base to which the computer system is assigned or at which the computer system is located). Further, the data 208a can include a record of an identifier associated with each of the computer systems 102a-102c, such as a serial number, a unique identifier (UID), an alphanumeric sequence, or some other identifying information.

As another example, the data 208a can include information regarding of each of the data storage devices 108a-108c. For instance, the data 208a can include a record of one or more users that are associated with each of the data storage devices 108a-108c. Further, the data 208a can include a record of an identifier associated with each of the data storage devices 108a-108c. Example identifiers include a serial number, a unique identifier (UID), an alphanumeric sequence, a Vendor Identification (VID) and Production Identification (PID) (for example, as specified by USB-IF in connection with a USB standard), or some other identifying information. Further, the data 208a can include indication of a type of each of the data storage devices 108a-108c (for example, whether each of the data storage devices is a flash drive or other semiconductor memory device, magnetic disk drive, magneto-optical disk drive, optical disk drive, or some other device. Further, the data 208a can include an indication of a model name or number of the data storage device, and an indication of the company that produced to manufactured, produced, sourced, or sold the data storage device. Further, the data 208a can include an indication whether the data storage device 108a-108c is expressly authorized for use with the system 100 (for example, whether the data storage device 108a-108c has been "whitelisted" for use with the system 100).

As another example, the data 208a can include information regarding the data that is stored each of the data storage devices 108a-108c. For instance, the data 208a can include a record of some or all of the contents of each of the data storage devices 108a-108c, and characteristics regarding that data. The characteristics can include, as examples, a data type of the data, a file type of the data, a data size of the data, a creation date of the data, a revision or modification date of the data, an author of the data, users who revised or modified the data, and a source of the data. As further examples, the characteristics can include an intended destination for the data (for example, a particular user, computer system, or facility with which the data is intended to be used) and an intended function of the data (for example, a particular task or operation with which the data is intended to be used). For instance, the data 208a can include a record indicating that the data stored on a particular data storage device is included to be used to update specific software package of a specific computer system in a specific facility.

As further examples, the characteristics can include a degree of confidentiality associated with the data, and a predicted impact of misplacing the data or disseminating the data to the public. As further examples, the characteristics can include data sharing permissions, such as whether the data is permitted to be transmitted to others, and if so, the methods of transmission that are permitted to be used to transmit that data (for example, e-mail, removable data storage devices, or some other method). In some one or more of the characteristics can be assigned to the data by a user (for example, an administrative user overseeing the operation of the system, such as a system operator).

As further examples, the characteristics can include information regarding the context in which the removable data storage devices are used. For instance, the characteristics can include the time of day and the date in which that the removable data storage device was communicatively coupled to a computer system. Further, the characteristics can include an indication of the user has was signed onto the computer system when the removable data storage device was communicatively coupled to a computer system.

In some implementations, at least some of the data 208a can be collected by the computer systems 102a-102d and transmitted to the security system 150 (for example, via the network 104 and the communications module 204). For example, each of the computer systems 102a-102d can collect information regarding removable data storage devices that are communicatively coupled to them, the data that is stored on the removable data storage devices, and the users that are associated with the removable storage devices. Further, each of the computer systems 102a-102d can collect information regarding the context in which the removable data storage devices are used. The computer system 102a-102d can transmit at least some of the collected information to the security system 150 for storage and further processing.

Further, the database module 202 can store training data 208b for training the security system 150 to determine a security risk associated with removable storage devices. As an example, the training data 208b can include historical information or regarding one or more computer systems, data storage devices, users of the computer systems or data storage devices, and data stored on the data storage devices. Further, the training data 208b can include historical information regarding the context in which the removable data storage devices were used. Further, the training data 208b can include information indicating whether particular data storage devices previously contained malicious software or other data that can compromise the security of a computer system.

As another example, the training data 208b can include synthetically generated information (for example, simulated or hypothetical characteristics of systems, devices, or users, rather than characteristics that are actually observed). As an example, the training data 208b can include synthetically generated information regarding one or more computer systems, data storage devices, users of the computer systems or data storage devices, the data stored on the data storage devices, and the context in which the removable data storage devices were used. Further, the training data 208b can include synthetically generated information indicating whether particular data storage devices previously contained malicious software or other data that can compromise the security of a computer system.

In general, the training data 208b can include types of information that are similar to those of the device and user data 208a described above. For example, the training data 208b can include historical or synthetic information regarding each of several computer systems, such as computer systems that are a part of the system 100, computer systems that were once part of the system 100, or other computer systems (such as those that are or once were a part of another system, or hypothetical computer systems with synthetically generated properties). The training data 208b can include, for instance, a record of one or more users that are associated with each of the computer systems, a record of a geographical location of each of the computer systems, and record of a facility that is associated with each of the computer systems. Further, the training data 208b can include a record of an identifier associated with each of the computer systems.

As another example, the training data 208b can include historical or synthetic information regarding of each of several data storage devices, such as data storage devices that are communicatively coupled to the computer systems of the system 100, data storage devices that were once communicatively coupled to the computer systems of the system 100, or other data storage devices (such as those that are or once were communicatively coupled to the computer systems of the system 100, or hypothetical data storage devices with synthetically generated properties). At least some of the training data 208b can be collected by the computer systems 102a-102d and transmitted to the security system 150 (for example, via the network 104 and the communications module 204).

The training data 208b can include, for instance, a record of one or more users that are associated with each of the data storage devices and a record of an identifier associated with each of the data storage devices. Further, the training data 208b can include historical or synthetic information regarding the data that is stored each of the data storage devices. For instance, the training data 208b can include a record of some or all of the contents of each of the data storage devices and characteristics regarding that data. The characteristics can include, as examples, a data type of the data, a file type of the data, a data size of the data, a creation date of the data, a revision or modification date of the data, an author of the data, users who revised or modified the data, and a source of the data. As further examples, the characteristics can include an intended destination for the data and an intended function of the data. Further, the training data 208b can include historical or synthetic information regarding the context in which the removable data storage devices are used. For instance, the characteristics can include the time of day and the date in which that the removable data storage device was communicatively coupled to a computer system. Further, the characteristics can include an indication of the user has was signed onto the computer system when the removable data storage device was communicatively coupled to a computer system.

Further, the training data 208b can include historical or synthetic information indicating a security risk associated with each of the data storage devices or the data stored on those data storage devices. For example, the training data 208b can indicate, for each of the data storage devices, whether the data storage device contains or once contained malicious software or other data that can compromise the security of a computer system.

The training data 208b can be used by the security system 150 to assess a security risk associated with removable storage devices more accurately. For example, a security system 150 can perform one or more machine learning or artificial intelligence processes to identify patterns or trends in input data that are indicative of a removable data storage device containing malicious software or other data that can compromise the security of a computer system, and to identify security risks based on those patterns or trends. At least a portion of the training data 208b can be used as input data in the machine learning or artificial intelligence processes (for example, to provide "ground truth" examples that can aid in the identification of patterns or trends). Accordingly, the security system 150 can be trained to identify new security risks based on previously identified security risks or synthetically generated security risks. In some implementations, the security system 150 can be iteratively trained and re-trained with successive sets of training data 208b (for example, additional sets of training data 208b that are collected over time) to progressively improve its accuracy in identifying security risks. In some implementations, this training process can be performed automatically by the security system 150 without manual user input. Example machine learning or artificial intelligence process are described in further detail below.

As another example, the database module 202 can store control rules 208c that specify how the security system 150 controls the operation of one or more computer systems (for example, the computer systems 102a-102c) based on the device and user data 208a and the training data 208b. For example, the control rules 208c can specify that if one or more particular criteria are satisfied, the security system 150 can authorize a particular computer system to retrieve data from a particular removable storage device. As another example, the control rules 208c can specify that if one or more other criteria are satisfied, the security system 150 can prevent a particular computer system from retrieving data from a particular removable storage device.

In some implementations, retrieving data from a particular removable storage device can include opening a particular file stored on the removable storage device. For example, the control rules 208c can specify criteria for authorizing a computer system to open a particular file stored on a removable storage device, and criteria for preventing the computer system from opening the file.

In some implementations, retrieving data from a particular removable storage device can include executing a particular executable file stored on the removable storage device. For example, the control rules 208c can specify criteria for authorizing a computer system to execute a particular executable file stored on a removable storage device, and criteria for preventing the computer system from executing the executable file.

In some implementations, the control rules 208c can be expressed, at least in part, using one or more security metrics generated by the security system 150. For example, one or more security metrics can be generated by the security system 150 based, at least in part, on the device and user data 208a and the training data 208b. The value of a security metric can represent a security risk associated with a removable data storage device or relative security risk associated with a removable data storage device (for instance, compared to that of other removable data storage devices). For example, the value of the security metric can represent a likelihood or probability that a particular removable data storage device contains malicious software or other data that can compromise the security of a computer system. In some implementations, the control rules 208c can specify that that if the security metric for a particular removable data storage device is sufficiently high (for example, exceeds a threshold value), the security system 150 should prevent a computer system from retrieving data from that removable storage device. Further, the control rules 208c can specify that that if the security metric for a particular removable data storage device is sufficiently low (for example, is less than or equal to the threshold value), the security system 150 should authorize the computer system to retrieve data from that removable storage device. Example techniques for calculating security metrics are described in further detail below.

As another example, the database module 202 can store notification rules 208d that specify circumstances in which the security system 150 will transmit notifications to one or more users or entities. As an example, the notification rules 208d can specify that notifications be transmitted to in response to certain trigger events or combination of trigger events. Further the notification rules 208d can specify that those notifications be transmitted to certain users or entities using certain communications techniques.

As an example, the notification rules 208d can specify that that if the security metric for a particular removable data storage device is sufficiently high, the security system 150 should prevent a computer system from retrieving data from that removable storage device and notify one more users or entities regarding the action. In some implementations, the control rules 208c can specify that that if the security metric for a particular removable data storage device is sufficiently low (for example, is less than or equal to the threshold value), the security system 150 should authorize the computer system to retrieve data from that removable storage device and notify one or more users or entities regarding the action. The one or more users or entities can include, for example, a user of the computer system to which the removable storage device was coupled, an administrative user overseeing the operation of the system (for example, a system operator), a user responsible for providing technique support with respect to the system, or some other user.

The communications module 204 allows for the transmission of data to and from the security system 150. For example, the communications module 204 can be communicatively connected to the network 104, such that it can transmit data to and receive data from each of the computer systems 102a-102d. Information received from the computer system 102a-102d can be processed (for example, using the processing module 206) and stored (for example, using the database module 202).

Further, information from the security system 150 (for example, information stored on the database module 202, or commands or instructions generated by the security system 150) can be transmitted to the other components of the system 100 through the communications module 204. For example, the communications module 204 can transmit commands or instructions to each of the computer systems 102a-102c that specify whether each of the computer systems 102a-102c is authorized to retrieve data from a particular removable storage device, or to prevent each of the computer systems 102a-102c from retrieving data from a particular removable storage device.

Further, notifications can be transmitted to the communication devices of one or more users or entities through the communications module 204. In some implementations, the notification can include one or more of an e-mail, a text message, a chat message, in instant message, a telephone call, a fax message, a video call, a pop-up notification (for example, presented on a graphical user interface), or some combination thereof. In some implementations, notifications can be transmitted to one or more of the computer systems 102a-102d. In some implementations, notifications can be transmitted to one or more other devices (for example, a telephone, fax machine, mobile computing device, wearable computing device, or some other device.

The processing module 206 processes data stored or otherwise accessible to the security system 150. For instance, the processing module 206 can determine, given particular device and user data 208a, training data 208b, and control rules 208c, a particular command or set of commands for controlling the operation of one or more of the components of the system 100. The commands can be provided to the other components of the system 100 using the communications module 204 and stored for later retrieval via the database module 202. As an example, a command can specify that a particular computer systems 102a-102c is authorized to retrieve data from a particular removable storage device. As another example, a command can specify that a particular computer systems 102a-102c is prevented from retrieving data from a particular removable storage device.

Further, the processing module 206 can determine can determine, given particular device and user data 208a, training data 208b, control rules 208c, and notification rules 208d, a notification or set of notifications to be transmitted to the communications devices of one or more users or entities. The commands can be provided to the other components of the system 100 using the communications module 204 and stored for later retrieval via the database module 202.

Further, the processing module 206 can generate or modify one or more of the control rules 208c based the training data 208b. For example, as described above, the processing module 206 can perform one or more machine learning or artificial intelligence processes to identify patterns or trends in input data that are indicative of a removable data storage device containing malicious software or other data that can compromise the security of a computer system, and to identify security risks based on those patterns or trends. The identified patterns or trends can be used to generate or modify one or more of the control rules 208c (for example, to distinguish between different types of security risks or different degrees of security risk). Further, as described above, at least a portion of the training data 208b can be used as input data in the machine learning or artificial intelligence processes. Further, as described above, the processing module 206 can perform the training processes iteratively using successive sets of training data 208b to progressively improve its accuracy in identifying security risks. In some implementations, this training process can be performed automatically by the processing module 206 without manual user input.

As described above, the security system 150 can generate and transmit commands that control the operation one or more of the computer systems 102a-102d, such as to selectively authorize one or more of the computer systems to retrieve data from particular removable storage devices or prevent one or more of the computer systems from doing so. In some implementations, these commands can be provided to a software layer of a computer system 102a-102d to facilitate the execution of these commands.

Figure 3:
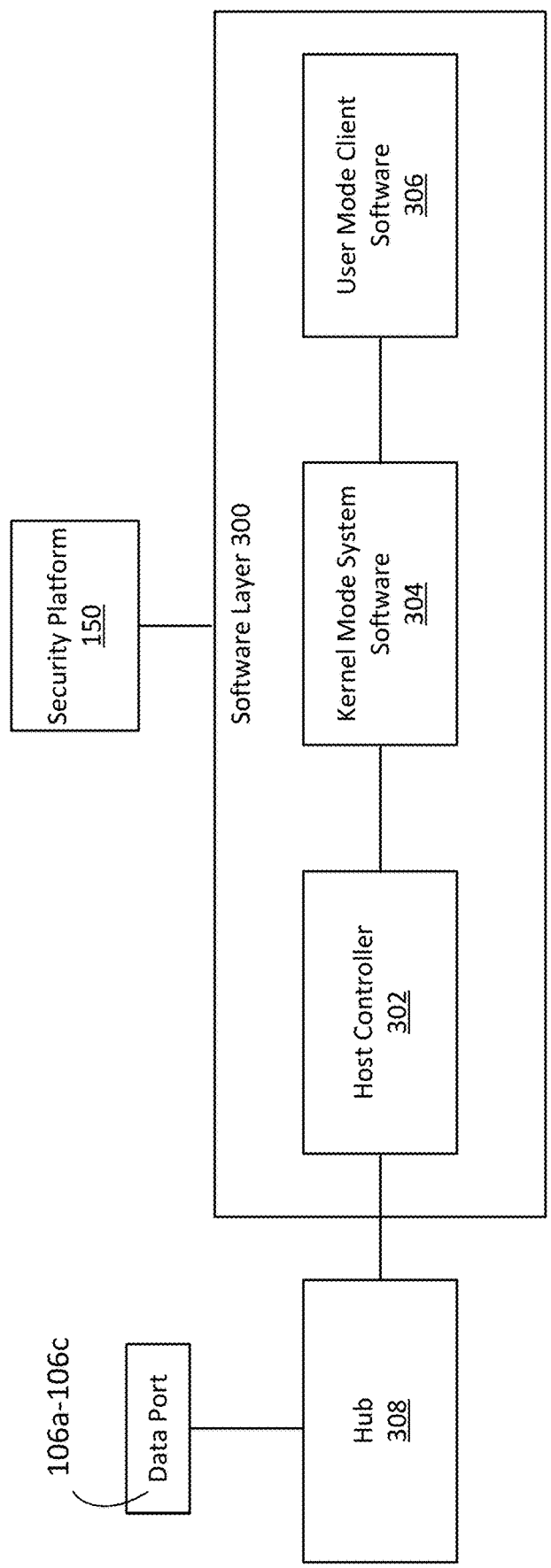
FIG. 3 is a diagram of a simplified software layer for controlling an exchange of data between a removable storage device and a computer system.

As an example, FIG. 3 shows a simplified software layer 300 for controlling an exchange of data between a removable storage device (for example, one or more of the removable data storage devices 108a-108c) and a computer system (for example, one or more of the computer systems 102a-102c). In some implementations, the software layer 300 can be implemented, at least in part, using one or more of the computer systems 102a-102c).

As shown in FIG. 3, the software layer includes a host controller 302, kernel mode system software 304, and user mode client software 306. The host controller 302 is a software interface is enables the software layer 300 to communicate with a hardware hub 308, to which a data port 106a-106c is communicatively coupled. As an example, the hub 308 can provide physical and electrical interconnections that communicatively couple the data port 106a-106c to the other components of a computer system 102a-102c. The host controller 302 can include software or firmware (for example, driver software) that enables the software layer 300 to interpret the electrical signals received by the hub 308 from the data port 106a-106c, and convert the electrical signals into digital data.

The host controller 302 can transmit the digital data to the kernel mode system software 304 for further processing. The kernel mode system software 304 includes one or more computer programs that act as the "core" of the computer system's operating system, and has complete control (or substantially complete control) over each of the components of the computer system. For example, the kernel mode system software 304 can facilitate interactions between hardware and software components, and can perform tasks such as running processes, managing hardware devices such as the hard disk, and handling interrupts. In some implemented, the kernel mode system software 304 can be stored or executed using privileged memory of the computer system, sometimes referred to as "kernel space."

Further, the kernel mode system software 304 can provide at least some of the digital data to the user mode client software 306 for further progressing. In some implementations, the user mode client software 306 can be referred to as "user space." The user mode client software 306 includes application software that can be executed by a user. Example application software include word processors, spreadsheets, web browsers, email clients, media players, file viewers, simulators, games, and photo editors. In some implemented, the kernel mode system software 304 can be stored or executed using non-privileged memory of the computer system, sometimes referred to as "user space."

The security system 150 can transmit commands to one of the host controller 302, the kernel mode system software 304, or the user mode client software 306 to control the transmission of data between a removable storage device 108a-108c and a computer system 102a-102c. For example, the security system 150 can transmit commands to the host controller 302 to selectively enable the software layer 300 to retrieve information from the hub 308 and the data port 106a-106c. As another example, the security system 150 can transmit commands to the host controller 302 to selectively prevent the software layer 300 from retrieving information from the hub 308 and the data port 106a-106c, or to discard some or all of the information received from the hub 308 and the data port 106a-106c.

As another example, the security system 150 can transmit commands to the kernel mode system software 304 to enable the kernel mode system software 304 to receive data from the host controller 302 and further process the received data (for example, by providing it to the user mode client software 306). As another example, the security system 150 can transmit commands to the kernel mode system software 304 to prevent the kernel mode system software 304 from receiving some or all of the data from the host controller 302, or to discard some or all of the data received from the host controller 302.

As another example, the security system 150 can transmit commands to the user mode client software 306 to enable the user mode client software 306 to receive data from the kernel mode system software 304 and further process the received data. As another example, the security system 150 can transmit commands to the user mode client software 306 to prevent the user mode client software 306 from receiving some or all of the data from the kernel mode system software 304, or to discard some or all of the data received from the kernel mode system software 304. As another example, the security system 150 can transmit commands to the user mode client software 306 to prevent some or all of the data received from the kernel mode system software 304 from being transmitted to other user mode client software (for example, other applications).

As described above, the security system 150 can control the operation of one or more computer systems (for example, the computer systems 102a-102c). For example, in accordance with one more of the control rules 208c, the security system 150 can selectively authorize a particular computer system to retrieve data from a particular removable storage device (for example, the removable storage devices 108*a*-108*c*), or selectively prevent a particular computer system from retrieving data from a particular removable storage device.

In some implementations, the security system 150 can control a transmission of data between computer systems and removable storage devices based, at least in part, on an association between each of the removable storage devices and a respective user, and a geographical location associated with an attempted use of each of the removable storage devices.

For example, the security system 150 can store records that indicate that a particular user is associated with one or more removable storage devices. For instance, when a user obtains a removable storage device, that storage device can be registered or "linked" to that user for use on the system 100. Records regarding the association between the user and each of his removable storage devices can be stored, for example, using the database module 202 shown and described with respect to FIG. 2.

When a user attempts to use a first removable storage device with a first computer system (for example, by communicatively coupling the first removable storage device to the first computer system), the security system 150 can identify, based on the records stored in the database module 202, the user that is associated with the first removable storage device. Further, the security system 150 can determine, based on the records stored in the database module 202, whether the identified user is associated with any other removable storage devices. Further, if the identified user is associated with other removable storage devices, the security system 150 can determine whether any of those other removable storage devices are currently in use, and if so, the geographical location associated with that user. For instance, the security system 150 can determine whether any of those other removable storage devices are currently communicatively coupled to a respective computer system, and if so, a geographical location of that computer system.

The security system 150 can control a transmission of data between the first computer system and the first removable based this information. For example, if the first user is not associated with any other removable storage devices, the security system 150 can enable a transmission of data between the first computer system and the first removable.

However, if the first user is associated with other removal storage devices, the security system 150 can prevent a transmission of data between the first computer system and the first removable if (i) another removable storage device is being concurrently used with use of the first removable storage device, and (ii) the geographical location associated with the use of the other removable storage device is sufficiently distant from the graphical location associated with the attempted use of the first removable storage device (for example, greater than a threshold distance). This can be beneficial, for example, a single user is unlikely to be using two different removable data storage devices concurrently at two locations that are remote from one another.

Further, the security system 150 can transmit one or more notifications regarding a use or an attempted use of a removable storage device. For example, if the security system 150 selectively prevents data from being retrieved from a particular removable storage device by a particular system, the security system 150 can generate a notification to a user (for example, an administrative user overseeing the operation of the system, a user responsible for providing technique support with respect to the system, or some other user). Further, the security system 150 can store a record of the event in the database module 202 for later retrieval and review. As another example, if the security system 150 selectively enables data to be retrieved from a particular removable storage device by a particular system, the security system 150 can generate a notification to a user (for example, an administrative user overseeing the operation of the system, a user responsible for providing technique support with respect to the system, or some other user), such that the user is apprised of the situation. Further, the security system 150 can store a record of the event in the database module 202 for later retrieval and review.

As an illustrative example, a User A can be associated with a USB Drive 1, a USB Drive 2, and a USB Drive 3. When the User A inserts the USB Drive 1 into a Computer System X, the security system 150 determines the User A is associated with the USB Drive 1, and as well as with the USB Drives 2 and 3. Further, the security system 150 determines whether none of the USB Drives 2 and 3 are inserted into any other computer systems concurrently with the USB Drive 1 being inserted into the Computer System X. In response, the security system 150 can authorize the Computer System X to retrieve data from the USB Drive 1. Further, the security system 150 can transmit a notification to a user (for example, an administrative user overseeing the operation of the system), and store a record of the use of the USB Drive 1 in the database module 202.

As another illustrative example, a User A can be associated with a USB Drive 1, a USB Drive 2, and a USB Drive 3. When the User A inserts the USB Drive 1 into a Computer System X, the security system 150 determines the User A is associated with the USB Drive 1, and as well as with the USB Drives 2 and 3. Further, the security system 150 determines that the USB Drives 2 is inserted into a Computer System Y concurrently with the USB Drive 1 being inserted into the Computer System X. Further, the security system 150 determines that the distance between the Computer System X and the Computer System Y is greater than a threshold distance. In response, the security system 150 can prevent the Computer System X from retrieving data from the USB Drive 1. In some implementations, the security system 150 can also prevent the Computer System Y from retrieving data from the USB Drive 2. Further, the security system 150 can transmit a notification to a user (for example, an administrative user overseeing the operation of the system), and store a record of the attempted use of the USB Drive 1 in the database module 202.

As another illustrative example, a User A can be associated with a USB Drive 1, a USB Drive 2, and a USB Drive 3. When the User A inserts the USB Drive 1 into a Computer System X, the security system 150 determines the User A is associated with the USB Drive 1, and as well as with the USB Drives 2 and 3. Further, the security system 150 determines that the USB Drives 2 is inserted into a Computer System Y concurrently with the USB Drive 1 being inserted into the Computer System X. Further, the security system 150 determines that the distance between the Computer System X and the Computer System Y is less than a threshold distance. In response, the security system 150 can authorize the Computer System X to retrieve data from the USB Drive 1, and authorize the Computer System 7 to retrieve data form the USB Drive 2. Further, the security system 150 can transmit a notification to a user (for example, an administrative user overseeing the operation of the system), and store a record of the use of the USB Drive 1 in the database module 202.

In practice, the threshold distance can vary, depending on the implementation. As examples, the threshold distance can be 10 feet, 100 feet, 1000 feet, 0.1 miles, 1 miles, 10 miles, or any other distance. In some implementations, the threshold distance can be manually specified by a user, such as an administrative user overseeing the operation of the system, a user responsible for providing technique support with respect to the system, or some other user.

As described above, in some implementations, a security system 150 can perform one or more machine learning or artificial intelligence processes to identify patterns or trends in input data that are indicative of a removable data storage device containing malicious software or other data that can compromise the security of a computer system, and to identify security risks based on those patterns or trends. For example, at least a portion of the training data 208b can be used as input data in the machine learning or artificial intelligence processes. Accordingly, the security system 150 can be trained to identify new security risks based on previously identified security risks or synthetically generated security risks.

Figure 4:
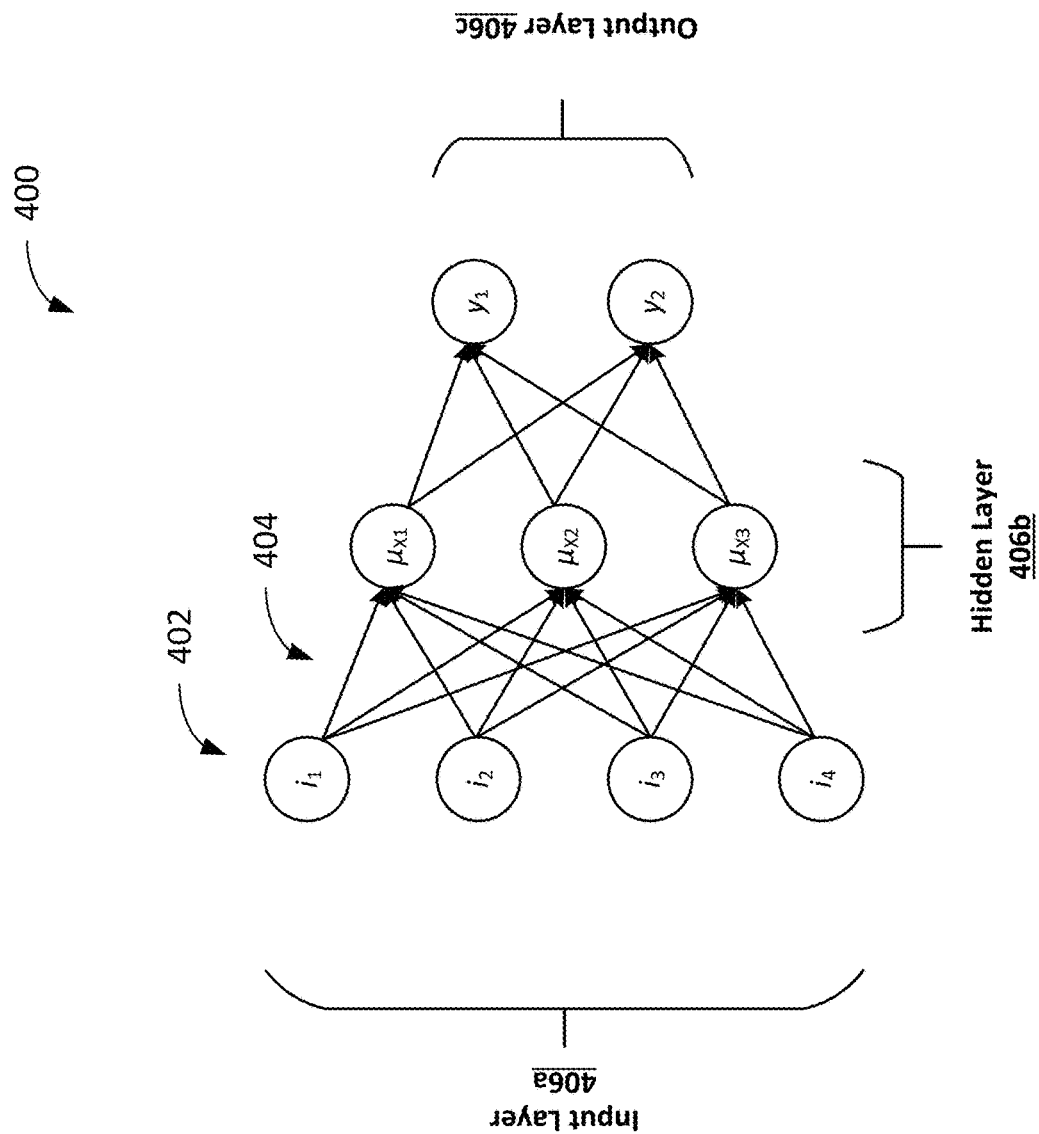
FIG. 4 is a diagram of an example neural network.

In some implementations, a machine learning or particular intelligence process can be performed using one or more neural networks. A simplified example of a neural network 400 is shown in FIG. 4.

The neural network 400 includes several nodes 402 (often called "neurons") interconnected with another by interconnections 404. Further, the nodes 402 are arranged according to multiple layers, including an input layer 406a, a hidden layer 406b, and an output layer 406c. The arrangement of the nodes 402 and the interconnections 404 between them represent a mathematical transformation of input data (for example, as received by the nodes of the input layer 406a) into corresponding output data (for example, as output by the nodes of the output layer 406c). In some implementations, the input data can represent one or more data points obtained by the security system 150, and the output data can represent one or more corresponding outcomes or decisions generated by the security system 150 based on the input data.

The nodes 402 of the input layer 406a receive input values and output the received input values to respective nodes of the next layer of the network 400. In this example, the network 400 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (for example, as indicated by the interconnections 404).

In some implementations, at least some of the information stored by the database module (for example, the data 208a) can be used as inputs for the nodes of the input layer 406a. For example, at least some of the information stored by the database module can be expressed numerically (for example, assigned a numerical score or value), and input into the nodes of the input layer 406a.

The nodes of the hidden layer 406b receive input values (for example, from the nodes of the input layer 406a or nodes of other hidden layers), applies particular transformations to the received values, and outputs the transformed values to respective nodes of the next layer of the network 400 (for example, as indicated by the interconnections 404). In this example, the network 400 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 406b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n}(weight_i * input_i) + \text{bias},$$

where $weight_i$ is the weight that is applied to an input $input_i$, bias is a bias or offset value is that is applied to the sum of the weighted inputs, and Y is the output of the node.

The nodes of the output layer 406c receive input values (for example from the nodes of the hidden layer 406b) and output the received values. In some implementations, nodes of the output layer 406c can also receive one or more input values, and transform the one or more received values according to a mathematical transfer function (for example, in a similar manner as the nodes of the hidden layer 406b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In this example, the network 400 includes two output nodes $y_1$ and $y_2$, each of which receives respective input values from the nodes $\mu_{x1}$, $\mu_{x2}$, and $\mu_3$, applies a respective transformation to the received values, and outputs the transformed values as outputs of the network 400.

Although FIG. 4 shows example nodes and example interconnections between them, this is merely an illustrative example. In practice, a network can include any number of nodes that are interconnected according to any arrangement. Further, although FIG. 4 shows networking 400 having a single hidden layer 406b, in practice, a network can include any number of hidden layers (for example, one, two, three, four, or more), or none at all.

Figure 5:
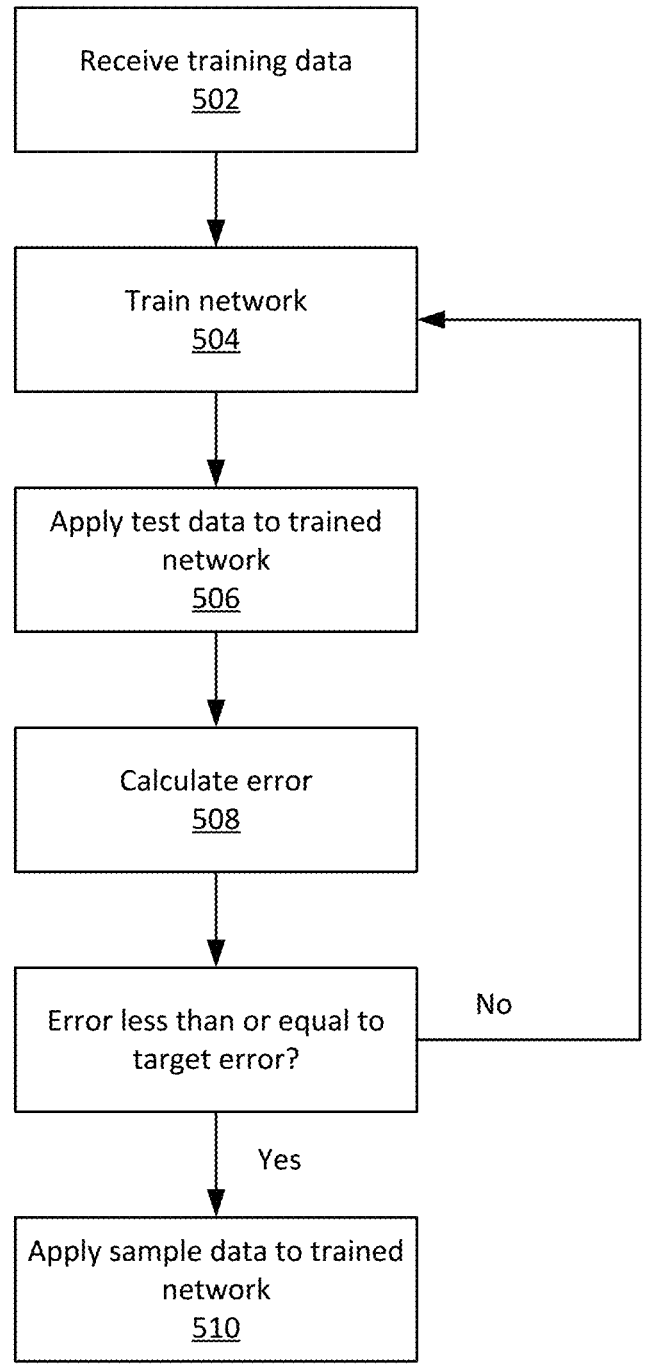
FIG. 5 is a flow chart diagram of an example process for training a neural network.

In some implementations, the neural network can be training based on training data, such as the training data stored in the database module 202. An example process 500 for training a neural network is shown in FIG. 5.

According to the process 500, the security system 150 receives training data (block 502). For example, as described above, the training data 208b can include historical or synthetic information or regarding one or more computer systems, data storage devices, users of the computer systems or data storage devices, and data stored on the data storage devices. Further, the training data 208b can include historical or synthetic information regarding the context in which the removable data storage devices were used. This information can be used as input data for training a neural network.

Further, the training data 208b can include historical or synthetic information indicating whether particular data storage devices previously contained malicious software or other data that can compromise the security of a computer system. This information can be used as the corresponding "ground truth" (for example, known outcomes given certain combinations of input data, or desired decisions by the security system 150 given certain combinations of input data).

The security system 150 trains the neural network based on the training data (block 504). For example, based on this training data 208b, the security system 150 can iteratively modify the arrangement of the nodes, the interconnections between the neural networks, and the transfer functions of each of the nodes (for example, the weights, the biases, or other aspects of the transfer function) to increase the predictive value of the neural network. For example, the security system 150 can iteratively perform these modifications, such that when the inputs of the training data 208b are provided to the neural network, output of the neural network better matches the "ground truth" of the training data 208b.

After training the neural network, the security system 150 applies test data (also referred to as "validation data") to the trained neural network (block 506). As an example, the security system 150 can reserve a portion of the training data 208b as test data, such that it is not used for training the neural network in block 504. After the neural network has been trained in block 504, the security system 150 can apply the test data as inputs to the trained neural network, and determine how well the neural network predicts the security risk based on the test data.

The security system 150 can calculate an error between (i) the security risk determined by the neural network based on the test data), and (ii) the known security risk specified by the test data (block 508).

If the error is sufficiently high (for example, greater than a threshold error value), the security system 150 can re-train the neural network (for example, by modifying the arrangement of the nodes, the interconnections between the nodes, and the transfer functions of one of more of the nodes) (block 504). In some implementations, the security system 150 can re-train the network by obtaining additional training data, and using the additional training data to re-train the neural network.

If the error is sufficiently low (for example, less than or equal to the threshold error value), the security system 150 can apply newly acquired sample data to the trained neural network (block 510). The newly acquired sample data can include, for example, information obtained during an operation of the system 100, such as when the removable storage devices 108a-108c are communicatively coupled to one more of the computer system 102a-102c.

Accordingly, the security system 150 can be trained to identify new security risks based on previously identified security risks or synthetically generated security risks.

As described above, in some implementations, the security system 150 can be iteratively trained and re-trained with successive sets of training data 208b (for example, additional sets of training data 208b that are collected over time) to progressively improve its accuracy in identifying security risks. In some implementations, this training process can be performed automatically by the security system 150 without manual user input.

In some implementations, the output of a neural network can be a security metric, the value for which represents a security risk associated with a removable data storage device or relative security risk associated with a removable data storage device (for instance, compared to that of other removable data storage devices). For example, the value of the security metric can represent a likelihood or probability that a particular removable data storage device contains malicious software or other data that can compromise the security of a computer system. In some implementations, if the security metric for a particular removable data storage device is sufficiently high (for example, exceeds a threshold value), the security system 150 can prevent a computer system from retrieving data from that removable storage device. Further, if the security metric for a particular removable data storage device is sufficiently low (for example, is less than or equal to the threshold value), the security system 150 can authorize the computer system to retrieve data from that removable storage device.

In some implementations, multiple threshold values for value range can be used. This can be helpful, for example, in enabling the neural network to select from three or more different outcomes or decisions. For example, if the value of the security metric is less than or equal to a first threshold value (for example, within a "low" range), this may indicate a "low" security risk. In response, the security system 150 can perform a first action (for example, authorize the computer system to retrieve data from that removable storage device. As another example, if the value of the security metric is greater than the first threshold value and less than or equal to a second threshold value (for example, within a "medium" range), this may indicate a "medium" security risk. In response, the security system 150 can perform a second action (for example, notify an administrative user regarding the attempted use of the removable storage device, and selectively authorize the computer system to retrieve data from that removable storage device depending on instructions from the administrative user). As another example, if the value of the security metric is greater than the second threshold value (for example, within a "high" range), this may indicate a "high" security risk. In response, the security system 150 can perform a third action (for example, automatically prevent a computer system from retrieving data from that removable storage device, and notify an administrative user regarding the attempted use of the removable storage device). In some implementations, a security metric can be normalized or constrained to a range of 0 to 1. Further, the first threshold value can be 0.15 and the second threshold value can be 0.35 (corresponding to first range of 0 to 0.15, a second range of 0.16 to 0.35, and a third range of 0.36 to 1).

Although two threshold values (and corresponding, three value ranges) are described above, this is merely an illustrative example. In practice, the threshold values and value ranges can different, depending on the implementation. Further, a security system 150 can operate according to any number of threshold values or value ranges, and can perform any particular action based on a security metric's value relative to the threshold values or value ranges.

The value of the security metric can be determined based one or more of the characteristics described in this disclosure. For example, when a particular user attempts to use a particular removable storage device with a particular computer system, some or all of the data 208a regarding the removable storage device, the computer system, and the user can be used as respective inputs in a neural network. Further, the output of the neuron network can represent a security risk associated with the removable storage device. Based on the output, the security system 150 can selectively authorize the computer system to retrieve data from the removable storage device, or prevent the computer system from retrieve data from the removable storage device based on the output.

As an illustrative example, a neural network can include at least two inputs.

A first input can represent whether a particular removable storage device has been expressly authorized for use with the system 100 (for example, whether a removable data storage device has been "whitelisted" for use with the system 100). In some implementations, this authorization can be specified, at least in part, by a user (for example, an administrative user overseeing the operation of the system, such as a system operator).

As an example, the first input can be assigned a first value (for example, 0) if the removable storage device has been expressly authorized for use with the system 100. As another example, the first input can be assigned a second value (for example, 1) if the removable storage device has not been expressly authorized for use with the system 100. Although example values are provided, these are merely illustrative examples. In practice, different values can be used, depending on the implementation.

A second input can represent whether the data stored on the removable storage device is intended to be used with a computer system associated with a particular facility (for example, a particular building, plant, complex, or base). In some implementations, the association between the data stored on a removable storage device and a particular facility can be specified, at least in part, by a user (for example, an administrative user overseeing the operation of the system, such as a system operator).

For example, a user may attempt to use a particular removable storage device with a computer system that is located in a first facility. If the data stored in removable storage device is intended to be used with computer systems of the first facility, the second input can be assigned a first value (for example, 0). If the removable storage device is intended to be used with computer systems of a different facility, the second input can be assigned a second value (for example, 0). Although example values are provided, these are merely illustrative examples. In practice, different values can be used, depending on the implementation.

Further, in some implementations, the first and the second inputs can be combined as a single input. For example, a user may attempt to use a particular removable storage device with a computer system that is located in a first facility. If (i) the removable storage device has been expressly authorized for use with the system 100, and (ii) the data stored in the removable storage device is intended to be used with computer systems of the first facility, the combined input can be assigned a first value (for example, 0).

Further, (i) the removable storage device has been expressly authorized for use with the system 100, and (ii) the data stored in the removable storage device is intended to be used with computer systems of a different facility, the combined input can be assigned a second value (for example, 0.5).

Further, (i) the removable storage device has not expressly authorized for use with the system 100, the combined input can be assigned a third value (for example, 0), regardless of whether the data stored in the removable storage device is intended to be used with computer systems of the first facility.

This can be summarized according to the table below:

| Removable storage device approved for use with the system? | Data on removable storage device intended to be used with the facility? | Input Value |
| --- | --- | --- |
| Yes | Yes | 0 |
| Yes | No | 0.5 |
| No | N/A | 1 |

Further, a neural network can include other inputs, either instead of or in addition to the two inputs described above.

As an example, a neural network can include another input corresponding to behaviors or actions that are performed with respective a particular portion of data (for example, a data file), and whether those behaviors or actions violates any rules. If the behaviors or actions violate any rules, this may be indicative of a malicious activity. As an example, a set of rules can include N rules, the violation of which may be indicative of a malicious activity. If the behaviors or actions violate X of these rules, the input value for the neural network can be X/N.

As an example, a rule can specify that a particular type of data file should not be stored a particular type of media storage device (for example, an executable file on a removable storage devices). Accordingly, if an executable file is stored on a removable storage device, an input value corresponding to that data file can be increased. As another example, a rule can specify that a specific type of data file should be not manipulated. Accordingly, if a data file of that type has been manipulated, an input value corresponding to that data file can be increased. Other rules can also be included, either in addition to those described above. Further, in some implementations, a neural network can automatically determine one or more rules (for example, by automatically identifying behaviors or actions that correlate with or otherwise be indicative of malicious activities).

In some implementations, the violation of each of the rule can be associated with a respective weight in determining an input value. For example, if the violation of a particular rule is more likely to be indicative of a malicious activity, the violation of that rule may have a greater impact on the input value. As another example, if the violation of a particular rule is less likely to be indicative of a malicious activity, the violation of that rule may have a lesser impact on the input value. In some implementations, a neural network can automatically determine one or more weights (for example, by automatically determining a degree to which a particular behavior or action is indicative of a malicious activity).

In some implementations, an input can be determined by monitoring the operation one or more of the computer systems (for example, the computer system 102a-102c), and determining whether behaviors of the users of the computer systems or actions performed by the users of the computer systems are indicative of malicious activity (for example, as described herein). In some implementations, the security system 150 can maintain a record of each of the users' activities, generate inputs for each of the users based on the records, and provide the inputs to a neural network for analysis.

Figure 6:
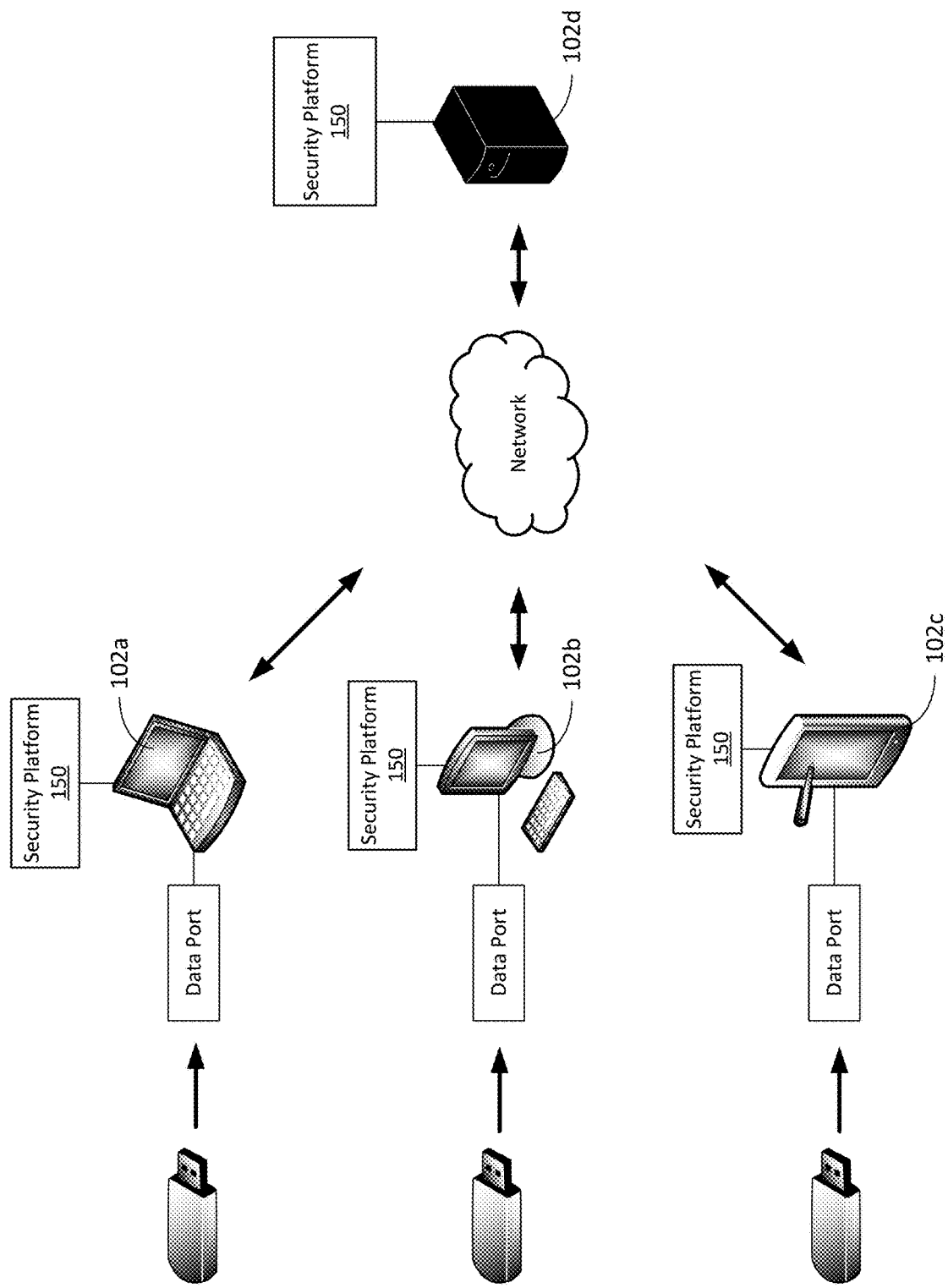
FIG. 6 is a diagram of another network-enabled system.

In the example shown in FIG. 1, the security platform 150 is implemented on a single computer system 102d. However, this need not always be the case. For example, referring to FIG. 6, the security platform 150 can be implemented on one of the computer systems 102a-102c individually, or on two more of the computer system 102a-102d in combination.

Example Processes

Figure 7A:
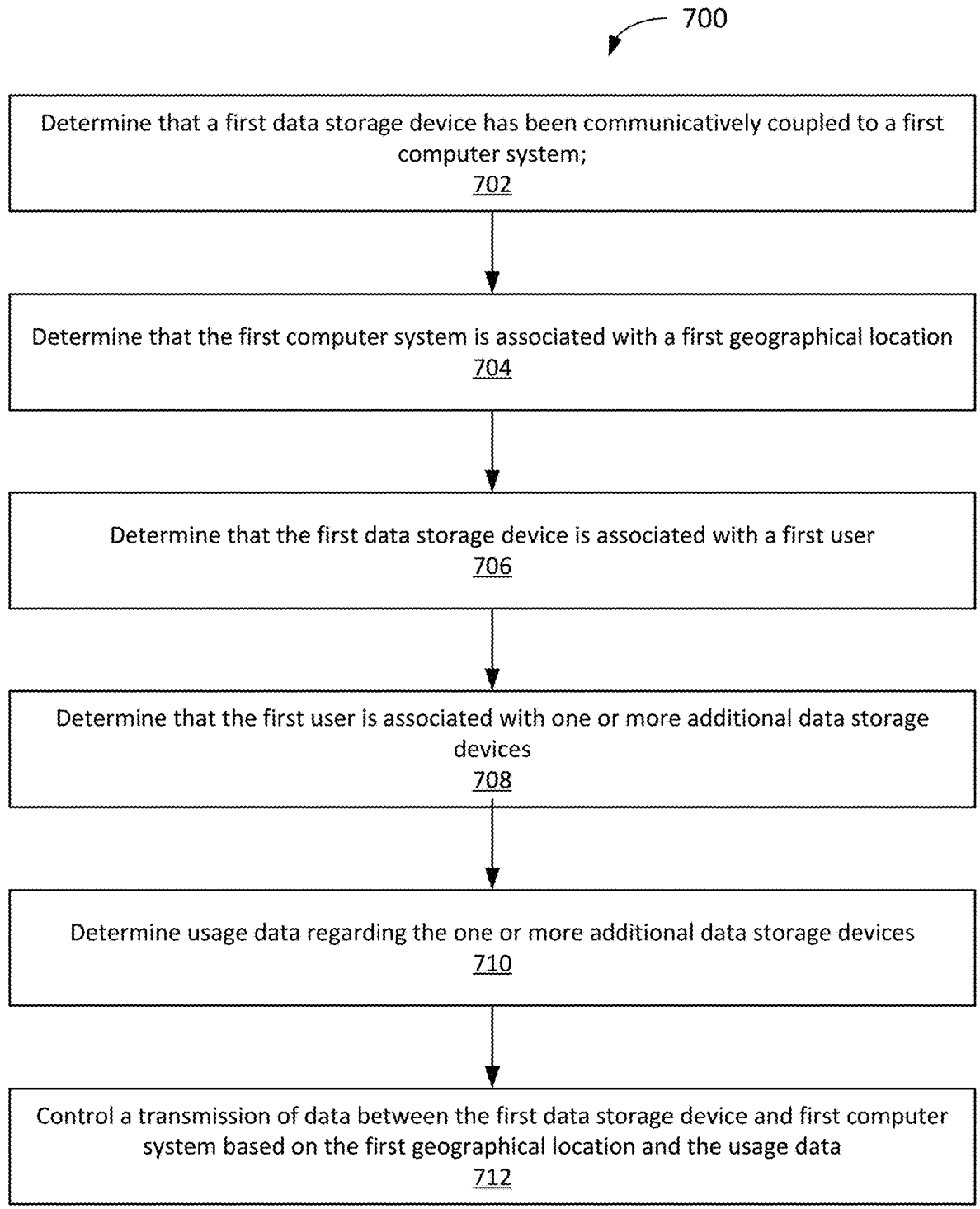
FIGS. 7A and 7B are flow chart diagrams of example processes for protecting a computer system against malicious software stored on removable data storage devices.

An example process 700 for protecting a computer system against malicious software stored on removable data storage devices is shown in FIG. 7A. In some implementations, the process 700 can be performed by the power management systems described in this disclosure (for example, the security system 150 shown and described with respect to FIGS. 1, 2, and 6) using one or more processors for example, using the processor or processors 810 shown in FIG. 8).

In the process 700, one or more processors determine that a first data storage device has been communicatively coupled to a first computer system (block 702). In some implementations, the first data storage device can be a first universal serial bus (USB) data storage device. In some implementations, determining that the first data storage device has been communicatively coupled to the first computer system can include determining that the first data storage data has been inserted into a physical data port of the first computer system.

The one or more processors determine that the first computer system is associated with a first geographical location (block 704).

The one or more processors determine that the first data storage device is associated with a first user (block 706).

The one or more processors determine that the first user is associated with one or more additional data storage devices (block 708). In some implementations, the one or more additional data storage devices can be one or more second USB data storage devices.

The one or more processors determine usage data regarding the one or more additional data storage devices (block 710).

In some implementations, the one or more additional data storage devices can include a second data storage device. Further, the usage data can include an indication that the second data storage device is communicatively coupled to a second computer system. Further, the usage data can include an indication of a second geographical location associated with the second computer system.

The one or more processors control a transmission of data between the first data storage device and first computer system based on the first geographical location and the usage data (block 712).

In some implementations, the transmission of data between the first data storage device and first computer system can be controlled by performing one or more operations. For example, a deamination can made that the second data storage device is communicatively coupled to the second computer system concurrently with the first data storage device being communicatively coupled to the first computer system. Further, a determination can be made that the first geographical location is within a threshold distance from the second geographical location. In response to these determinations, the first computer system can be enabled or authorized to receive data from the first data storage device.

As another example, a determination can be made that the second data storage device is not communicatively coupled to the second computer system concurrently with the first data storage device being communicatively coupled to the first computer system. In response to this determination, the first computer system can be enabled or authorized to receive data from the first data storage device.

As another example, a determination can be made that the second data storage device is communicatively coupled to the second computer system concurrently with the first data storage device being communicatively coupled to the first computer system. Further, a determination can be made that the first geographical location is greater than a threshold distance from the second geographical location. In response to these determinations, a retrieval of data from the first data storage device by the first computer system can be limited or restricted. In some implementations, limiting the retrieval of data from the first data storage device by the first computer system can include preventing the first computer system from retrieving data from the first data storage device.

In some implementations, the one or more processors can be remote from the first computer system. In some implementations, the first computer system can include the one or more processors.

Figure 7B:
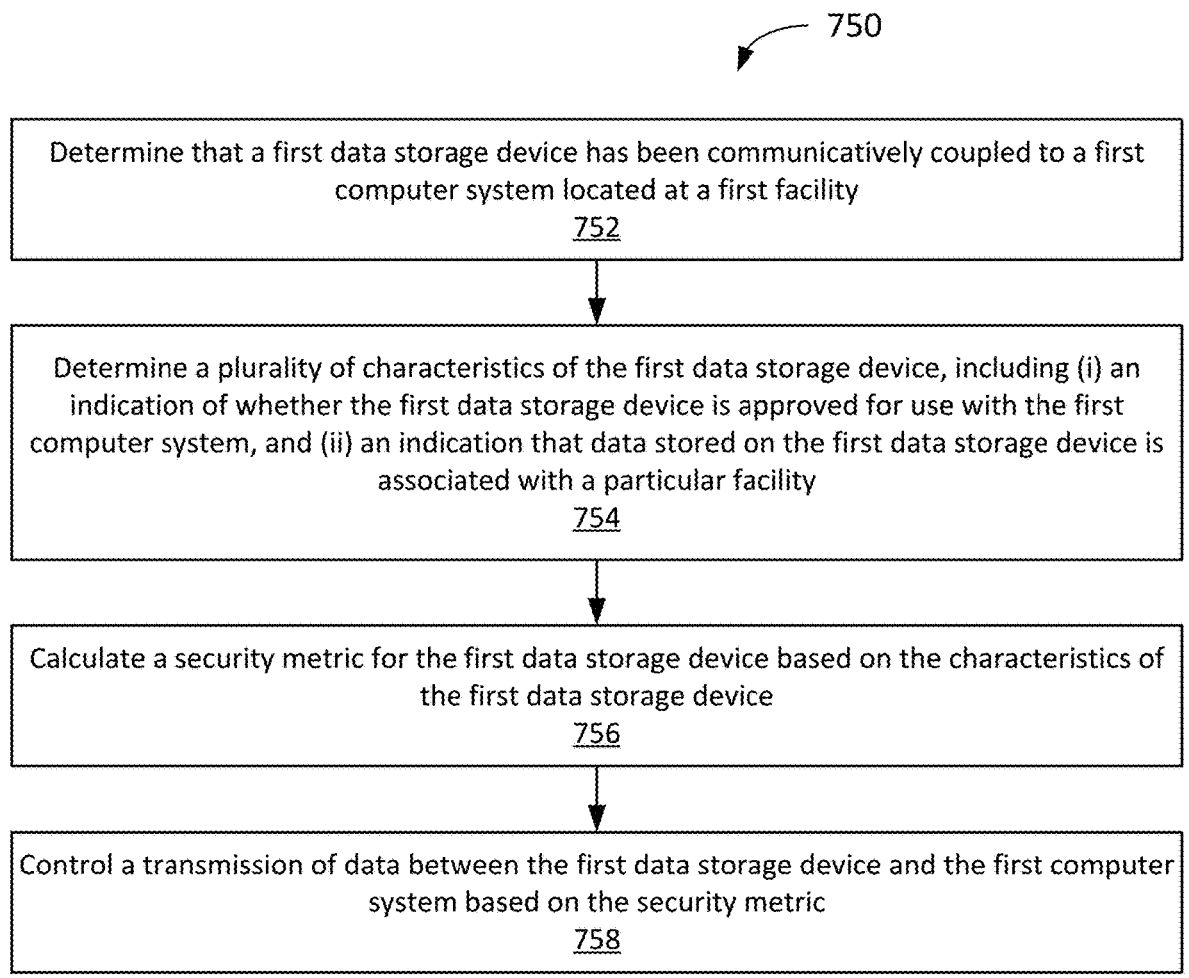

Another example process 750 for protecting a computer system against malicious software stored on removable data storage devices is shown in FIG. 7B. In some implementations, the process 750 can be performed by the power management systems described in this disclosure (for example, the security system 150 shown and described with respect to FIGS. 1, 2, and 6) using one or more processors for example, using the processor or processors 810 shown in FIG. 8).

In the process 750, one or more processors determine that a first data storage device has been communicatively coupled to a first computer system located at a first facility (block 752). In some implementations, the first data storage device can be a first universal serial bus (USB) data storage device. In some implantations, determining that the first data storage device has been communicatively coupled to the first computer system can include determining that the first data storage data has been inserted into a physical data port of the first computer system.

The one or more processors determine a plurality of characteristics of the first data storage device (block 754). The characteristics of the first data storage device include an indication of whether the first data storage device is approved for use with the first computer system. The characteristics of the first data storage device also include an indication that data stored on the first data storage device is associated with a particular facility.

The one or more processors calculate a security metric for the first data storage device based on the characteristics of the first data storage device (block 756).

In some implementations, calculating the security metric for the first data storage device can include determining a weighted sum of a plurality of scores. Each of the scores can be associated with a different one of the characteristics of the first data storage device. In some implementations, a weight associated with one of the characteristics of the first data storage device can be different from a weight associated with another one of the characteristics of the first data storage device.

In some implementations, calculating the security metric for the first data storage device can include determining that the particular facility associated with the data stored on the first data storage device is the same as the first facility, and in response, increasing a value of a first score of the plurality of scores.

In some implementations, calculating the security metric for the first data storage device can include determining that the particular facility associated with the data stored on the first data storage device is different from the first facility, and in response, decreasing a value of a first score of the plurality of scores.

In some implementations, calculating the security metric for the first data storage device can include determining that the particular facility associated with the data stored on the first data storage device is the same as the first facility, and in response, increasing a value of a first score of the plurality of scores.

In some implementations, calculating the security metric for the first data storage device can include determining that the particular facility associated with the data stored on the first data storage device is different from the first facility, and in response, decreasing a value of a first score of the plurality of scores.

The one or more processors control a transmission of data between the first data storage device and the first computer system based on the security metric (block 758).

In some implementations, controlling the transmission of data between the first data storage device and the first computer system can include determining that a value of the security metric is greater than a threshold value, and in response, enabling or authorizing the first computer system to receive data from the first data storage device.

In some implementations, controlling the transmission of data between the first data storage device and the first computer system can include determining that a value of the security metric is less than or equal to a threshold value, and in response, limiting a retrieval of data from the first data storage device by the first computer system. In some implementations, limiting the retrieval of data from the first data storage device by the first computer system can include preventing the first computer system from retrieving data from the first data storage device.

In some implementations, the process 750 can also include determining, using the one or more processors, security data regarding one or more security events with respect to at least one of the first computer system or one or more additional computer systems. The process 750 can also include modifying at least one of the weights based on the security data.

In some implementations, the security data can include an indication that a first security event is associated with a second data storage device, and an indication of one or more characteristics of the second data storage device. In some implementations, the first security event can be a detection of malware on the second data storage device.

In some implementations, the one or more processors can be remote from the first computer system. In some implementations, the first computer system can include the one or more processors.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and security system 150 can be implemented using digital electronic circuitry, or in computer software, firmware, or hardware, or in combinations of one or more of them. In another example, the processes 700 and 750 shown in FIGS. 7A and 7B can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 8:
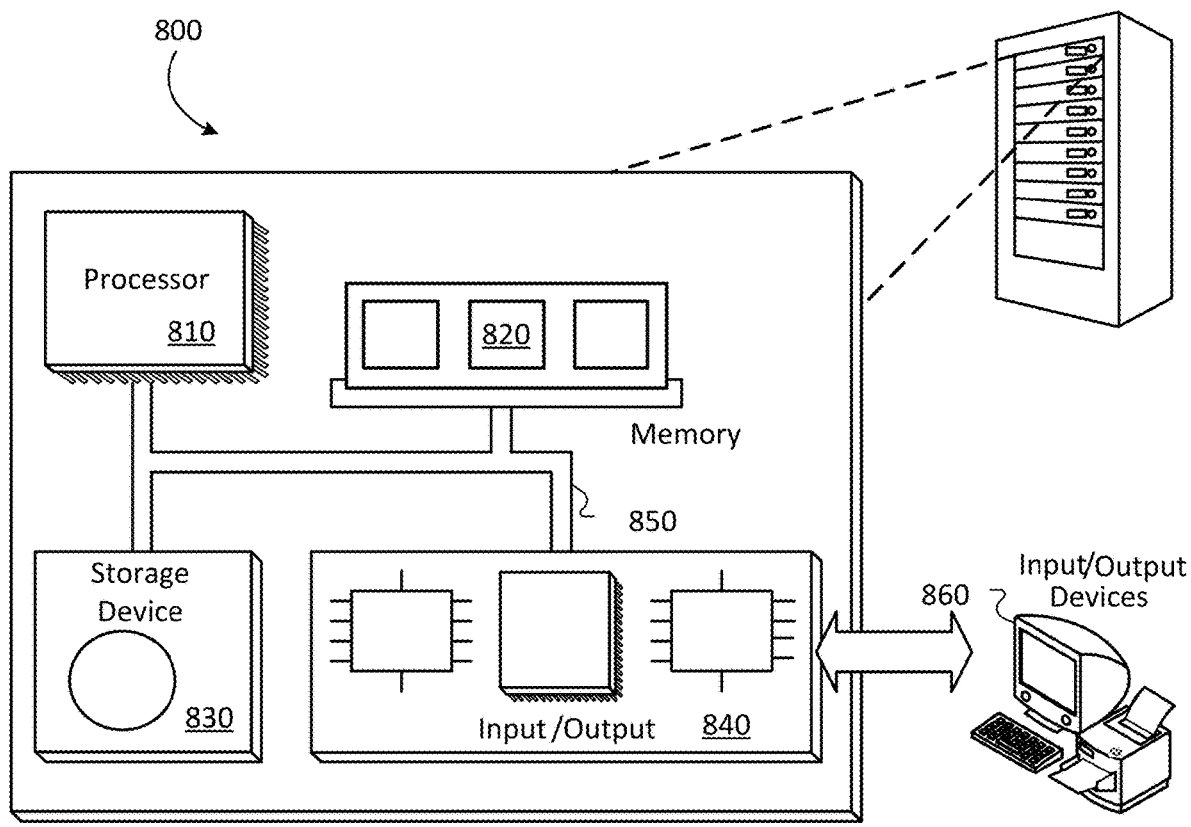
FIG. 8 is a schematic diagram of an example computer system.

FIG. 8 shows an example computer system 800 that includes a processor 810, a memory 820, a storage device 830 and an input/output device 840. Each of the components 810, 820, 830 and 840 can be interconnected, for example, by a system bus 850. In some implementations, the computer system 800 can be used to control the operation of the system 100. For example, the security system 150 in FIG. 1 can include a computer system 800 to control the operation of the system 100, including the transmission of data between the data storage device 108a-108c and the computer system 102a-102c. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
    determining, using one or more processors, that a first data storage device has been communicatively coupled to a first computer system;
    determining, using the one or more processors, that the first computer system is associated with a first geographical location;
    determining, using the one or more processors, that the first data storage device is associated with a first user;
    determining, using the one or more processors, that the first user is associated with one or more additional data storage devices;
    determining, using the one or more processors, usage data regarding the one or more additional data storage devices; and
    controlling, by the one or more processors, a transmission of data between the first data storage device and first computer system based on the first geographical location and the usage data,
    wherein the one or more additional data storage devices comprises a second data storage device,
    wherein the usage data comprises:
        an indication that the second data storage device is communicatively coupled to a second computer system, and
        an indication of a second geographical location associated with the second computer system, and
    wherein controlling the transmission of data between the first data storage device and first computer system comprises:
        determining that the second data storage device is communicatively coupled to the second computer system concurrently with the first data storage device being communicatively coupled to the first computer system;
        determining that the first geographical location is within a threshold distance from the second geographical location; and
        responsive to (i) determining that the second data storage device is communicatively coupled to the second computer system concurrently with the first data storage device being communicatively coupled to the first computer system and (ii) determining that the first geographical location is within the threshold distance from the second geographical location, enabling the first computer system to receive data from the first data storage device.

2. The method of claim 1, wherein controlling the transmission of data between the first data storage device and first computer system further comprises:
determining that the second data storage device is not communicatively coupled to the second computer system concurrently with the first data storage device being communicatively coupled to the first computer system; and
responsive to determining that the second data storage device is not communicatively coupled to the second computer system concurrently with the first data storage device being communicatively coupled to the first computer system, enabling the first computer system to receive data from the first data storage device.

3. The method of claim 1, wherein controlling the transmission of data between the first data storage device and first computer system further comprises:
determining that the second data storage device is communicatively coupled to the second computer system concurrently with the first data storage device being communicatively coupled to the first computer system;
determining that the first geographical location is greater than the threshold distance from the second geographical location; and
responsive to (i) determining that the second data storage device is communicatively coupled to the second computer system concurrently with the first data storage device being communicatively coupled to the first computer system and (ii) determining that the first geographical location is greater than the threshold distance from the second geographical location, limiting a retrieval of data from the first data storage device by the first computer system.

4. The method of claim 3, wherein limiting the retrieval of data from the first data storage device by the first computer system comprises:
preventing the first computer system from retrieving data from the first data storage device.

5. The method of claim 1, wherein the first data storage device is a first universal serial bus (USB) data storage device.

6. The method of claim 5, wherein the one or more additional data storage devices are one or more second USB data storage devices.

7. The method of claim 1, wherein determining that the first data storage device has been communicatively coupled to the first computer system comprises:
determining that the first data storage data has been inserted into a physical data port of the first computer system.

8. The method of claim 1, wherein the one or more processors are remote from the first computer system.

9. The method of claim 1, wherein the first computer system comprises the one or more processors.

10. A system comprising:
one or more processors; and
one or more non-transitory computer readable media storing instructions that, when executed by the one or more processors, cause the one or more processors to perform operations comprising:
determining a first data storage device has been communicatively coupled to a first computer system;
determining that the first computer system is associated with a first geographical location;
determining that the first data storage device is associated with a first user;
determining that the first user is associated with one or more additional data storage devices;
determining usage data regarding the one or more additional data storage devices; and
controlling a transmission of data between the first data storage device and first computer system based on the first geographical location and the usage data,
wherein the one or more additional data storage devices comprises a second data storage device,
wherein the usage data comprises:
an indication that the second data storage device is communicatively coupled to a second computer system, and
an indication of a second geographical location associated with the second computer system, and
wherein controlling the transmission of data between the first data storage device and first computer system comprises:
determining that the second data storage device is communicatively coupled to the second computer system concurrently with the first data storage device being communicatively coupled to the first computer system;
determining that the first geographical location is within a threshold distance from the second geographical location; and
responsive to (i) determining that the second data storage device is communicatively coupled to the second computer system concurrently with the first data storage device being communicatively coupled to the first computer system and (ii) determining that the first geographical location is within the threshold distance from the second geographical location, enabling the first computer system to receive data from the first data storage device.

11. One or more non-transitory computer readable media storing instructions that, when executed by one or more processors, cause the one or more processors to perform determining a first data storage device has been communicatively coupled to a first computer system;
determining that the first computer system is associated with a first geographical location;
determining that the first data storage device is associated with a first user;
determining that the first user is associated with one or more additional data storage devices;
determining usage data regarding the one or more additional data storage devices; and
controlling a transmission of data between the first data storage device and first computer system based on the first geographical location and the usage data,
wherein the one or more additional data storage devices comprises a second data storage device,
wherein the usage data comprises:
an indication that the second data storage device is communicatively coupled to a second computer system, and
an indication of a second geographical location associated with the second computer system, and wherein controlling the transmission of data between the first data storage device and first computer system comprises:
- determining that the second data storage device is communicatively coupled to the second computer system concurrently with the first data storage device being communicatively coupled to the first computer system;
- determining that the first geographical location is within a threshold distance from the second geographical location; and
- responsive to (i) determining that the second data storage device is communicatively coupled to the second computer system concurrently with the first data storage device being communicatively coupled to the first computer system and (ii) determining that the first geographical location is within the threshold distance from the second geographical location, enabling the first computer system to receive data from the first data storage device.

12. A method comprising:
- determining, using one or more processors, that a first data storage device has been communicatively coupled to a first computer system located at a first facility;
- determining, using the one or more processors, a plurality of characteristics of the first data storage device, wherein the characteristics of the first data storage device comprise:
  - an indication of whether the first data storage device is approved for use with the first computer system, and
  - an indication that data stored on the first data storage device is associated with a particular facility; and
- calculating, using the one or more processors, a security metric for the first data storage device based on the characteristics of the first data storage device,
  - wherein calculating the security metric for the first data storage device comprises determining a weighted sum of a plurality of scores, wherein each of the scores is associated with a different one of the characteristics of the first data storage device, and
  - wherein a weight associated with one of the characteristics of the first data storage device is different from a weight associated with another one of the characteristics of the first data storage device; and
- controlling, by the one or more processors, a transmission of data between the first data storage device and the first computer system based on the security metric.

13. The method of claim 12, wherein calculating the security metric for the first data storage device comprises:
- determining that the particular facility associated with the data stored on the first data storage device is the same as the first facility; and
- responsive to determining that the particular facility associated with the data stored on the first data storage device is the same as the first facility, increasing a value of a first score of the plurality of scores.

14. The method of claim 12, wherein calculating the security metric for the first data storage device comprises:
- determining that the particular facility associated with the data stored on the first data storage device is different from the first facility; and
- responsive to determining that the particular facility associated with the data stored on the first data storage device is different from the first facility, decreasing a value of a first score of the plurality of scores.

15. The method of claim 12, wherein calculating the security metric for the first data storage device comprises:
- determining that the particular facility associated with the data stored on the first data storage device is the same as the first facility; and
- responsive to determining that the particular facility associated with the data stored on the first data storage device is the same as the first facility, increasing a value of a first score of the plurality of scores.

16. The method of claim 12, wherein calculating the security metric for the first data storage device comprises:
- determining that the particular facility associated with the data stored on the first data storage device is different from the first facility; and
- responsive to determining that the particular facility associated with the data stored on the first data storage device is different from the first facility, decreasing a value of a first score of the plurality of scores.

17. The method of claim 12, further comprising:
- determining, using the one or more processors, security data regarding one or more security events with respect to at least one of the first computer system or one or more additional computer systems; and
- modifying at least one of the weights based on the security data.

18. The method of claim 17, wherein the security data comprises:
- an indication that a first security event is associated with a second data storage device, and
- an indication of one or more characteristics of the second data storage device.

19. The method of claim 18, wherein the first security event is a detection of malware on the second data storage device.

20. The method of claim 12, wherein controlling the transmission of data between the first data storage device and the first computer system comprises:
- determining that a value of the security metric is greater than a threshold value, and
- responsive to determining that the value of the security metric is greater than the threshold value, enabling the first computer system to receive data from the first data storage device.

21. The method of claim 12, wherein controlling the transmission of data between the first data storage device and the first computer system comprises:
- determining that a value of the security metric is less than or equal to a threshold value, and
- responsive to determining that the value of the security metric is less than or equal to the threshold value, limiting a retrieval of data from the first data storage device by the first computer system.

22. The method of claim 21, wherein limiting the retrieval of data from the first data storage device by the first computer system comprises:
- preventing the first computer system from retrieving data from the first data storage device.

23. The method of claim 12, wherein the first data storage device is a first universal serial bus (USB) data storage device.

24. The method of claim 12, wherein determining that the first data storage device has been communicatively coupled to the first computer system comprises:
- determining that the first data storage data has been inserted into a physical data port of the first computer system.

25. The method of claim 12, wherein the one or more processors are remote from the first computer system.

26. The method of claim 12, wherein the first computer system comprises the one or more processors.

27. A system comprising:
one or more processors; and
one or more non-transitory computer readable media storing instructions that, when executed by the one or more processors, cause the one or more processors to perform operations comprising:
  determining that a first data storage device has been communicatively coupled to a first computer system located at a first facility;
  determining a plurality of characteristics of the first data storage device, wherein the characteristics of the first data storage device comprise:
    an indication of whether the first data storage device is approved for use with the first computer system, and
    an indication that data stored on the first data storage device is associated with a particular facility; and
  calculating a security metric for the first data storage device based on the characteristics of the first data storage device,
    wherein calculating the security metric for the first data storage device comprises determining a weighted sum of a plurality of scores, wherein each of the scores is associated with a different one of the characteristics of the first data storage device, and
    wherein a weight associated with one of the characteristics of the first data storage device is different from a weight associated with another one of the characteristics of the first data storage device; and
  controlling a transmission of data between the first data storage device and the first computer system based on the security metric.

28. One or more non-transitory computer readable media storing instructions that, when executed by one or more processors, cause the one or more processors to perform determining a first data storage device has been communicatively coupled to a first computer system;
  determining that a first data storage device has been communicatively coupled to a first computer system located at a first facility;
  determining a plurality of characteristics of the first data storage device, wherein the characteristics of the first data storage device comprise:
    an indication of whether the first data storage device is approved for use with the first computer system, and
    an indication that data stored on the first data storage device is associated with a particular facility; and
  calculating a security metric for the first data storage device based on the characteristics of the first data storage device,
    wherein calculating the security metric for the first data storage device comprises determining a weighted sum of a plurality of scores, wherein each of the scores is associated with a different one of the characteristics of the first data storage device, and
    wherein a weight associated with one of the characteristics of the first data storage device is different from a weight associated with another one of the characteristics of the first data storage device; and
  controlling a transmission of data between the first data storage device and the first computer system based on the security metric.

\* \* \* \* \*